(12) United States Patent
Michel et al.

(10) Patent No.: US 9,137,807 B2
(45) Date of Patent: Sep. 15, 2015

(54) METHOD AND DEVICE FOR DATA PROCESSING IN A WIRELESS NETWORK

(75) Inventors: Juergen Michel, Munich (DE); Bernhard Raaf, Neuried (DE); Simone Redana, Munich (DE); Oumer Teyeb, Stockholm (SE)

(73) Assignee: Nokia Solutions and Networks Oy, Espoo (FI)

( * ) Notice: Subject to any disclaimer, the term of this patent is extended or adjusted under 35 U.S.C. 154(b) by 240 days.

(21) Appl. No.: 13/578,041

(22) PCT Filed: Feb. 10, 2010

(86) PCT No.: PCT/EP2010/051608
§ 371 (c)(1),
(2), (4) Date: Sep. 14, 2012

(87) PCT Pub. No.: WO2011/098119
PCT Pub. Date: Aug. 18, 2011

(65) Prior Publication Data
US 2013/0003646 A1    Jan. 3, 2013

(51) Int. Cl.
| | |
|---|---|
| G01R 31/08 | (2006.01) |
| H04W 72/08 | (2009.01) |
| H04W 72/12 | (2009.01) |
| H04B 7/155 | (2006.01) |
| H04W 28/06 | (2009.01) |
| H04W 28/08 | (2009.01) |
| H04W 84/04 | (2009.01) |
| H04W 92/20 | (2009.01) |

(52) U.S. Cl.
CPC ......... *H04W 72/082* (2013.01); *H04B 7/15592* (2013.01); *H04W 72/1289* (2013.01); *H04W 28/06* (2013.01); *H04W 28/08* (2013.01); *H04W 84/047* (2013.01); *H04W 92/20* (2013.01)

(58) Field of Classification Search
USPC .................. 370/252, 315, 328, 329; 345/555
See application file for complete search history.

(56) References Cited

U.S. PATENT DOCUMENTS

| | | | |
|---|---|---|---|
| 2008/0049690 A1* | 2/2008 | Kuchibhotla et al. | 370/338 |
| 2008/0081626 A1* | 4/2008 | Choi et al. | 455/442 |
| 2009/0201846 A1* | 8/2009 | Horn et al. | 370/315 |
| 2010/0216394 A1* | 8/2010 | Shin et al. | 455/9 |
| 2011/0038431 A1* | 2/2011 | Frederiksen et al. | 375/259 |

(Continued)

FOREIGN PATENT DOCUMENTS

GB    2 458 258 A    9/2009

OTHER PUBLICATIONS

Teyeb, O., et al., "Dynamic Relaying in 3GPP LTE-Advanced Networks", EURASIP Journal on Wireless Communications and Networking, vol. 2009, Article ID731317, Hindawi Publishing Corp., 12 pgs.

(Continued)

*Primary Examiner* — Phuongchau Ba Nguyen
(74) *Attorney, Agent, or Firm* — Harrington & Smith

(57) ABSTRACT

A method and a device for data processing in a wireless network are provided, wherein at least one relay node is served by a base station, wherein load partitioning for the at least one relay node is conducted based on at least one load information message, and wherein the at least one load information message includes information regarding resource blocks and sub-frames. Furthermore, a communication system is suggested including at least one such device.

20 Claims, 7 Drawing Sheets

(56) References Cited

U.S. PATENT DOCUMENTS

2012/0087276 A1* 4/2012 Huang et al. .................. 370/253
2012/0113794 A1* 5/2012 Roman et al. .................. 370/201

OTHER PUBLICATIONS

Xiao, D., et al., "LI Delay Impact on ICIC in type 1 Relay", © 2009 IEEE, 4 pgs.

R1-090790, 3GPP TSG RAN WG1 Meeting #56, Athens, Greece, Feb. 9-13, 2009, "Consideration on Resource Allocation for Relay Backhaul Link", LG Electronics, 5 pgs.

3GPP TS 36.423 V9.1.0 (Dec. 2009), "$3^{rd}$ Generation Partnership Project: Technical Specification Group Radio Access Network; Evolved Universal Terrestrial Radio Access Network (E-UTRAN); X2 application protocol (X2AP) (Release 9)", 114 pgs.

* cited by examiner

METHOD AND DEVICE FOR DATA PROCESSING IN A WIRELESS NETWORK

TECHNICAL FIELD

The invention relates to a method and to a device for data processing in a wireless network. Also, a communication system comprising at least one such device is suggested.

BACKGROUND

Relay stations (RSs) or Relay Nodes (RNs) have been proposed to extend coverage of a cellular system. Further, relay concepts may be utilized for provisioning of high bit rate coverage in a shadowed environment;
reducing an average radio-transmission power at a user equipment (UE), thereby increasing the battery life of the UE;
enhancing a capacity of the cellular system as well as its effective throughput, e.g., increasing a cell-edge capacity and/or a balancing cell load;
enhancing an overall performance and deployment cost of a radio access network (RAN).

FIG. 1 illustrates a typical deployment scenario of an LTE radio access network (RAN) comprising fixed relay nodes.

FIG. 1 shows a macro cell 109 comprising a base station or eNB 101, which is also referred to as a donor eNB (d-eNB). A UE 102 is directly served by the d-eNB 101. Furthermore, relay nodes 103, 104, 105 are served by the d-eNB 101 via backhaul links. A UE 106 is connected to the relay node 103, a UE 107 is connected to the relay node 104 and a UE 108 is connected to the relay node 105. The link between the UE 102, 106 to 108 and the d-eNB or the relay nodes 103 to 105 is also referred to as access link.

There are several kinds of relay systems. One example of a relay system comprises an amplifying and/or forwarding mechanism, e.g., applied in single frequency DVB-H networks.

Another example of a relay system utilizes a network coding scheme to improve the overall performance. A common relay type proposed for cellular relaying is a detect/forward type of relay, wherein an input signal is detected and retransmitted using the same procedure as in the original transmission.

Relaying can be realized at different layers of a protocol stack. An amplify-and-forward relaying scheme can be realized at a layer-1 of a protocol stack comprising (some part of) a physical (PHY) layer. Layer-2 relay nodes may include the protocol stack up to MAC/RLC layers, thereby enabling decentralized radio resource management. Layer-3 or higher layer relay nodes could be considered as wireless base stations and may support all protocol layers of a common base station. Such layer-3 relaying functionality may be referred to as type 1 relays pursuant to 3GPP.

In order to be economically viable, LTE-A is required to be as much backward compatible with Release 8 as possible. This is in particular crucial for the UE side, because then users may benefit from their Release 8 terminals being relayed. Hence, from a UE's viewpoint, a serving network node may advantageously function in the same way as does a Release 8 enhanced NodeB (eNB).

Based on such a requirement it may be difficult to reduce the capability or functionality of a relay node (compared to the base station, eNB) and at the same time still maintain full downward compatibility. Furthermore, relay nodes may have to support all main eNB functions. Hence, relay nodes may be capable of flexible resource sharing with a controlling eNB.

For example, at most two hops are allowed in the system, i.e. the eNB may directly serve the UE or it may serve the UE via a RN. In addition, a tree topology may be used, i.e. the RNs may not be connected with each other. These assumptions may be used in order to simplify the system setting. However, network topologies not employing these restrictions may be utilized as well.

A resource partitioning mechanism is required to coordinate radio resource usage within a macro cell between the d-eNB and the RNs. As the RN's transmitter causes interference to its own receiver, simultaneous d-eNB to RN and RN to UE transmissions on the same frequency resource may not be feasible unless sufficient isolation of the outgoing and incoming signals is provided, e.g., by means of specific, separated and/or isolated antenna structures.

Similarly, at the RN it may not be possible to receive UE transmissions simultaneously with the RN transmitting to the d-eNB. One possibility to handle the interference problem is to operate the RN such that it is not transmitting to UEs when it is supposed to receive data from the d-eNB, i.e. to create "gaps" in the resources used for transmitting data from the RN to the UE.

FIG. 2 shows a schematic diagram comprising several sub-frames visualizing an exemplary communication scheme. A sub-frame 201 comprising control information 202 and further data 203 is used for conveying data from a relay node to a UE. Another sub-frame 204 indicates a transmission gap, i.e. no data is conveyed between the relay node and the UE. Hence, this transmission gap can be used for d-eNB to relay node transmission purposes.

Such transmission gaps during which UEs (also Release 8 compliant UEs) are not supposed to expect any RN transmission can be created by configuring MBSFN sub-frames as also indicated in FIG. 2. Transmissions from the relay node to the d-eNB can be facilitated by not allowing any UE to RN transmissions in some sub-frames.

A centralized resource partitioning can be utilized, wherein the d-eNB assigns resources that each relay node connected to the d-eNB can utilize to serve its connected UEs. A user scheduling can be done at the relay nodes assuming, e.g., that only the resources assigned by the d-eNB are available.

FIG. 3 shows a schematic diagram depicting an example of a resource partitioning within a repetition window (or a resource partitioning window), wherein each relay node communicates with its connected UEs and with its d-eNB (in FIG. 3 referred to as "eNB") in different sub-frames. The transmission between the d-eNB and its connected UEs can occur both within the sub-frame the relay node communicates with its UEs (if this is feasible due to an actual interference scenario) as well as within the sub-frame the relay node communicates with the d-eNB (not shown in FIG. 3).

In the Release 8 specification (e.g., 3GPP TS 36.423, Evolved Universal Terrestrial Radio Access Network (E-UTRAN); X2 Application Protocol (X2AP), V9.1.0, 2009-12) neighbor eNBs exchange the following load information messages to control inter-cell interference in uplink (UL) direction:

(a) An overload indication (OI) message indicates an interference level experienced by a sending eNB on each physical resource block (PRB) or group of PRBs. The OI is transmitted together with a source cell ID, i.e. the message contains the information about which cell is interfered. It is noted that one eNB can have multiple cells, therefore an indication of merely the eNB may not suffice and additional information may be provided for identification purposes.

(b) A high interference indication (HII) message indicates an occurrence of high interference sensitivity as perceived from a sending eNB on each PRB or group of PRBs. Hence, the HII message indicates where the sending eNB intends to schedule cell edge users. The HII message may be used to notify cell edge users resource usage so that neighbor cells can decide either not to schedule their users or only schedule center cell users on the resources advertised in the HII message. The HII message may be transmitted together with a target cell ID, i.e. it specifies from which cells a high interference could potentially affect the sending eNB. It is noted that an identification of the target eNB may not suffice, because it could have multiple cells. Hence, additional information may be provided for identification purposes.

These messages are used for inter-cell coordination between neighboring eNBs, but in the case of relaying, the interference co-ordination is basically carried out via resource partitioning.

The approach provided solves the problem as how to provide an efficient solution to support resource partitioning in particular in an LTE-A network utilizing at least one relay node.

SUMMARY

This problem is solved according to the features of the independent claims. Further embodiments result from the depending claims.

In order to overcome this problem, a method for data processing in a wireless network is suggested,
 wherein at least one relay node is served by a base station,
 wherein load partitioning for the at least one relay node is conducted based on at least one load information message,
 wherein the at least one load information message comprises information regarding resource blocks and sub-frames.

It is in particular noted that the load partitioning may comprise any resource partitioning.

Advantageously, this solution allows partitioning of radio resources, e.g., in an LTE-A environment using relay nodes, and at the same time keeping a reduced (in particular minimized) level interference.

It is noted that a relay node may be any network element or node that is capable of relaying information, in particular between the base station and a mobile terminal. The relay node may comprise various protocol stacks and it may in particular comprise a protocol stack up to layer-3 and higher in order to provide (nearly) the same functionality as does the base station. This bears the advantage that the relay node may be regarded as base station by the mobile terminal and thus the solution provided is compatible with legacy mobile terminals.

Accordingly, the approach provided in particular suggests using load messages (OI and/or HII messages), wherein the load messages may comprise bitmaps over PRBs (or group(s) of PRBs) and sub-frames (or group(s) of sub-frames).

Hence, the resource partitioning can be described over the frequency and also over the time domain.

It is noted that the resource blocks may be physical resource blocks, e.g., resources in the frequency or code domain. The sub-frames may refer to any resource in the time domain, in particular to several transmission time intervals (TTIs).

It is further noted that the allocation of resources, in particular resource blocks and sub-frames, can be conducted at the base station for several relay nodes considering preferred resources and sub-frames as indicated by the relay nodes and/or as indicated by interference information (e.g., overload indication information) provided by the relay nodes.

In an embodiment, the at least one load information message is based on a high interference indication message and/or on an overload indication message.

Hence, the load information messages can be based on high interference indication (HII) messages and/or on overload indication (OI) messages as specified in LTE Release 8. The message format provided by LTE Release 8 may be utilized or amended to provide load partitioning information in a network environment with a base station (eNB) serving at least one relay node (RN).

Hence, the solution may use existing messaging for performing resource partitioning between the base station and the relay nodes controlled by this base station. Existing messages may be amended in particular because the bitmaps of the messages are specified for each cell of the sending base station (eNB) and as many as 256 cells can be supported by a single base station. As RNs may primarily have only one cell, HII and OI bitmaps may be amended to contain multiple cell information to support the multiple TTI bitmap extensions without changing the message formats itself.

In another embodiment, the resource block comprises at least one group of resource blocks and/or wherein the sub-frames comprises at least one group of sub-frames.

In a further embodiment, the load information message is sent from the relay node to the base station comprising a partitioning request information.

Thus, the relay node may inform the base station about its preference on sub-frames and resource blocks (e.g., PRBs) to be used, e.g., by sending bitmap information to the base station. For this purpose a modified HII message can be used.

In a next embodiment, the partitioning request information comprises resource blocks and sub-frames that are preferred by the relay node.

It is noted that the preferably used resource blocks and sub-frames may be determined by the relay node based on previous interference measurements or based on previously used resource blocks and sub-frames with no or minor disturbance.

It is also an embodiment that the partitioning request information comprises additional resource blocks and sub-frames that are preferred by the relay node, wherein the resource blocks and sub-frames requested extend beyond what is currently required by the relay node for conveying data.

It is noted that a number of resource blocks and a number of sub-frames requested may extend beyond what is currently required by the relay node for conveying data. It is also noted that a total amount of resource blocks and a total amount of sub-frames requested may extend beyond what is currently required by the relay node for conveying data.

This may help the base station to decide about the current resource partitioning, e.g., among several relay nodes. Hence, information regarding the amount of resources actually required by the relay node and information regarding a level of preference for these resources may be transmitted from the relay node to the base station.

Pursuant to another embodiment, the load information message is sent from the relay node to the base station comprising an information about the interference levels.

Hence, the load information message may comprise an interference information, in particular an overload indication (OI) message. This information could be utilized by the base station to decide which resource blocks and sub-frames to allocate for a particular relay node.

According to an embodiment, the load information message is sent from the base station to the relay node comprising load partitioning information, wherein the relay node utilizes this load partitioning information.

The base station may decide based on the partitioning request information obtained from the relay node about an appropriate resource allocation (i.e. resource blocks and sub-frames) and transmits the result of this decision back to the relay node, e.g., by using a (modified) HII message. Once the message is received, the relay node may follow this base station's instruction and may allocate the resources.

It is noted that that neighboring base stations (eNBs) may exchange their own allocation information at a peer-to-peer level, in particular by utilizing a (wired) X2 interface; thus, each base station can determine which resources are appropriate for its relay nodes, especially for the relay nodes deployed on the edges to other base stations. This allows reducing the interference between base stations and relay nodes and thus improves the overall performance of the wireless network.

According to another embodiment, the load information message is sent from the base station to the relay node comprising information on resources the base station assigned to other relay nodes and/or resources used by the base station itself.

Hence, the load information message (e.g., modified HII message) may comprise the information on which resources the base station intends to schedule its users and in particular which resources have been assigned to the other relay nodes and therefore cannot be used by the target relay node. Hence, the target relay node may derive from such load information message which sub-frames and resource blocks (e.g., PRBs) it can use for its mobile terminals (UEs), i.e. which sub-frames and resource blocks are neither used by the base station itself or by any adjacent relay nodes.

In yet another embodiment, the at least one load message comprises a bitmap information indicating the resource blocks and sub-frames.

The bitmap information may be any representation of the resource blocks and the sub-frames. Hence, by conveying the bitmap information, the relay node or the base station identify which resources they would like to obtain (in case the relay node sends the load message) or which resources to be allocated (in case the base station sends the load message to the relay node).

According to a next embodiment, the bitmap information is compressed.

Thus, a compression of the transmitted bitmaps can be applied in order to reduce the overhead of transmitting resource allocation messages to numerous relay nodes. Various compression schemes can be utilized.

For example, the bitmap information can be compressed by combining columns and/or rows of a resource block such that columns and/or rows having identical values are combined to a single column and/or row.

It is noted that the at least one load information message could be broadcasted from the base station to the at least one relay node, wherein several relay nodes are able to distinguish their specific resource partitioning from one another.

Pursuant to yet an embodiment, the bitmap information is compressed depending on a traffic situation on a backhaul link and/or an overhead traffic threshold on the backhaul link.

For example, for low and medium loads in the network (the backhaul link is not overloaded in such cases) it may be beneficial to exchange more precise information regarding the resource partitioning conducting a reduced or no compression scheme. In high load situations, a high compression scheme may be applicable. This high compression scheme may not be lossless, i.e. it may reduce the degree of information, but allow saving bandwidth.

According to a further embodiment, the wireless network is a 3GPP wireless network, in particular an LTE-A network.

The problem stated above is also solved by a device for data processing in a wireless network comprising a processing unit that is arranged,
  for conducting load partitioning for at least one relay node
    based on at least one load information message, wherein
    the at least one relay node is served by a base station, and
  wherein the at least one load information message comprises information regarding resource blocks and sub-frames.

It is noted that such a device may be an element of the wireless network, in particular a base station (e.g., an eNB or a d-eNB) or a relay node (RN) of the wireless network. The remaining features described with regard to the method apply accordingly to such a device.

It is noted that the steps of the method stated herein may be executable on the processing unit as well.

It is further noted that each processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

DETAILED DESCRIPTION

Figure 1:
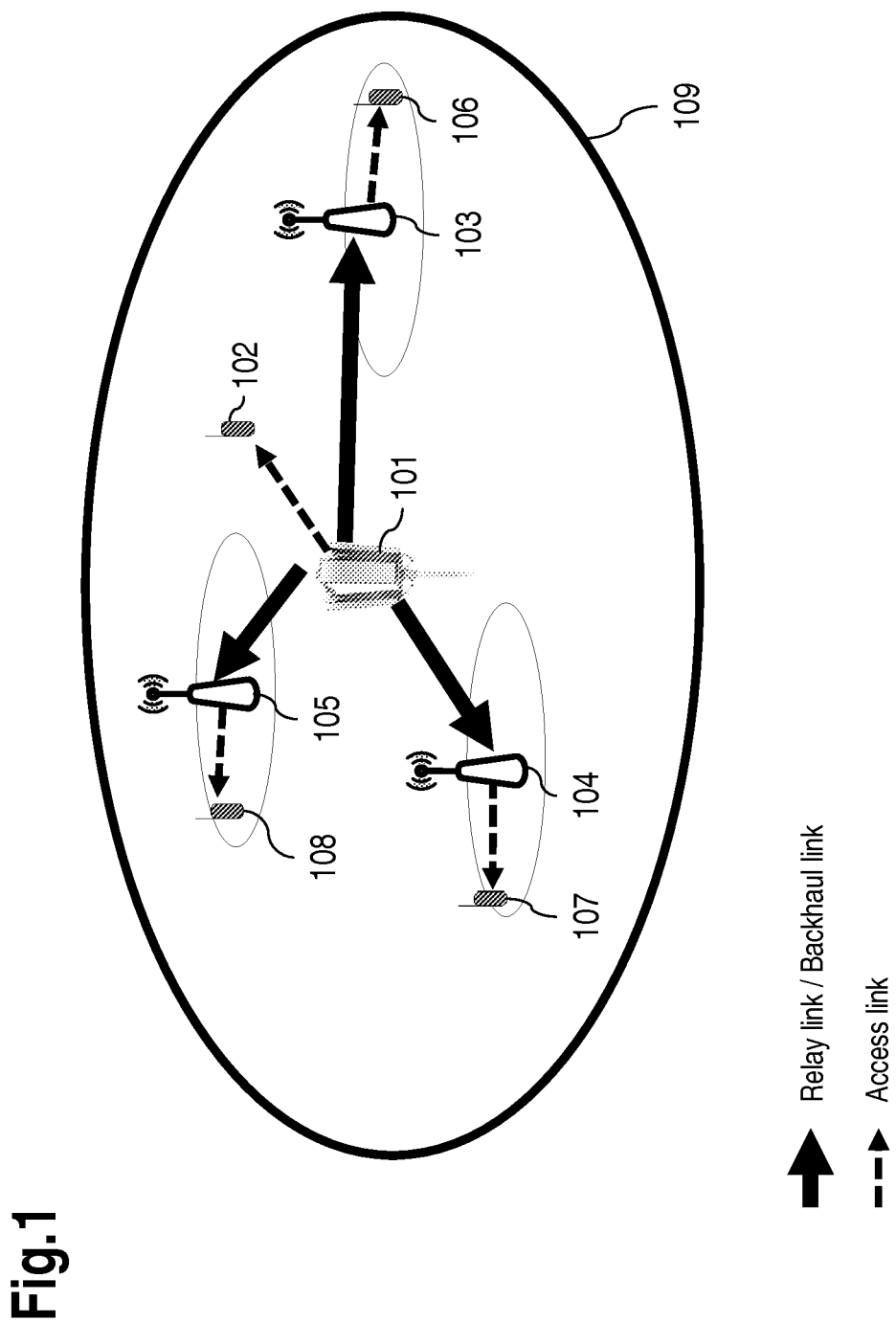
FIG. 1 shows a typical deployment scenario of an LTE radio access network (RAN) comprising fixed relay nodes.
Figure 2:
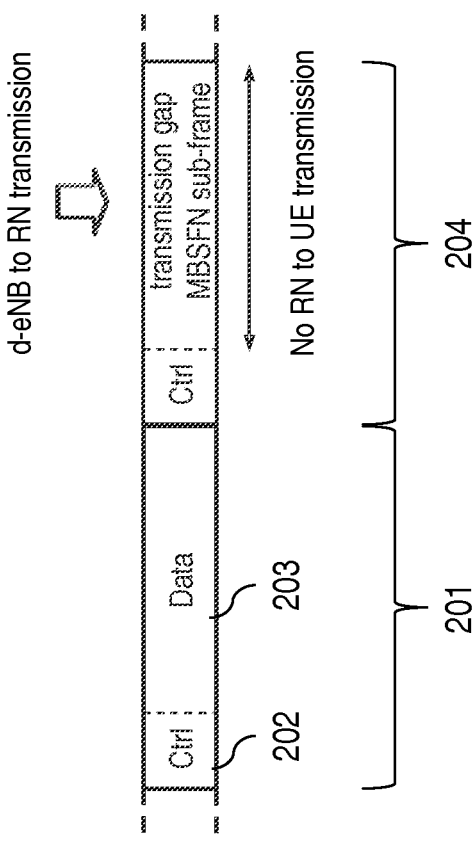
FIG. 2 shows a schematic diagram comprising several sub-frames visualizing an exemplary communication scheme.
Figure 3:
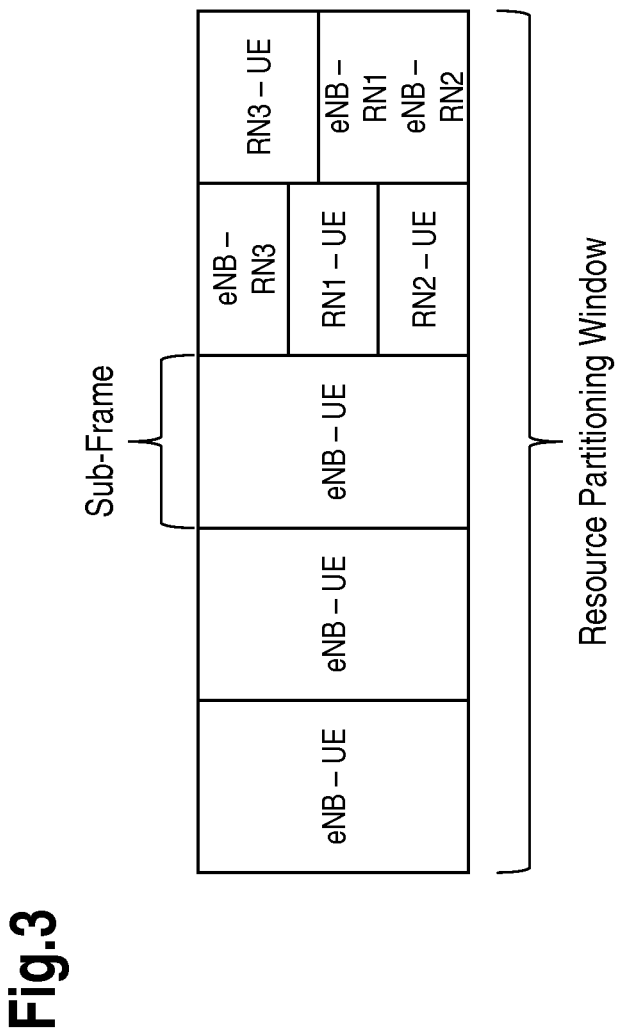
FIG. 3 shows a schematic diagram depicting an example of a resource partitioning within a repetition window (or a resource partitioning window)

The solution provided in particular suggests using the load information messages OI and HII for performing the resource partitioning between a donor eNB (d-eNB) and at least one relay node (RN), especially several relay nodes. At least one RN may be served by a d-eNB.

Advantageously, a load information exchange between adjacent eNBs does not have to be modified by this approach and may be used as specified for LTE-A Release 8 or any upcoming standard.

In particular, at least one of the following mechanisms may be added to the load information exchange as specified in Release 8 to provide the resource partitioning mechanism in LTE:
(a) The load messages (OI and/or HII messages) exchanged between the d-eNB and the RNs may refer to several transmission time intervals (TTIs), e.g., equal to a number of sub-frames of the resource partitioning window. Hereinafter, the messages exchanged over the backhaul link between the d-eNB and the RN are referred to as OI-r and HII-r messages.
(b) The HII-r message sent from the RN to the d-eNB may comprise partitioning request information.
(c) The HII-r message sent from the d-eNB to the RNs may contain resource partitioning information. Each RN may have to utilize the allocation received from the d-eNB.

This approach suggests using load messages (in particular OI and/or HII messages) comprising patterns (e.g., bit patterns) over PRBs or a group of PRBs and sub-frames or a group of sub-frames. This allows resource partitioning in the frequency domain as well as in the time domain.

The extension of the load messages to multiple TTIs may increase the overhead produced by the single message on the backhaul link, but since they describe multiple TTIs they are not required to be sent as frequently as the Release 8 messages. An eNB may change a resource partitioning on a time scale that is long enough to guarantee that other radio resource management (RRM) functions, e.g., the user scheduler, adapt to these changes imposed by the eNB.

Even common inter-cell interference coordination (ICIC) schemes operated by using existing Release 8 HII and OI messages may operate on a smaller time scale. Therefore, this long time scale update of the resource partitioning is less critical for the associated overhead.

Furthermore, the resource partitioning may be changed rather infrequent and thus sending the load messages is not particularly time critical. Hence, if a link is overloaded, sending the load message can be delayed by several seconds until there is again spare capacity for sending the load message.

A RN may inform the d-eNB about its preference on sub-frames and/or PRBs to use by sending a bitmap to the d-eNB. The RN's preference may stem from experience; for example, the RN can average the channel quality indicators (CQIs) of all its UEs for each PRB, and indicate to the d-eNB the top x % of the PRBs in terms of average CQI. The HII-r message can be used for this purpose.

In Release 8 the sending eNB transmits to the neighboring eNBs the HII message containing a decision already taken on which resources to schedule cell-edge users. In the relay-based deployment as described herein, this communication may be modified as the RN may indicate to which resources its connected UEs are to be scheduled. However, using these resources has to be acknowledged by the d-eNB in advance.

Hence, the HII-r message sent from the RN to the d-eNB may not contain a scheduling scheme already decided on, but a scheduling scheme indicating resources the RN would preferably obtain.

The HII-r message can contain a number of preferred resources that exceed the number of resources actually needed by the RN; this may help the d-eNB to decide about the actual resource partitioning. Hence, information regarding the amount of resources effectively required by the RN (and the level of preference for these resources at the RN) may also be transmitted from the RN to the d-eNB. For example, although the RN only requires one PRB, in may request via the HII-r message two resource blocks, PRBa and PRBb, in addition to an information that the RN would prefer using PRBb over PRBa. Hence, the preference could be considered by the d-eNB deciding upon the resource allocation in view of, e.g., other RNs also requesting (the same or other) resources.

The resource partitioning request may not be a mandatory message. The d-eNB does not need to know the preference of each RN for deciding about the resource partitioning. Information about the interference levels (OI-r message) measured at the RNs could be used by the d-eNB to decide about the resource partitioning (in addition or as an alternative to the preference provided by the RN). However, if the backhaul link is not overloaded and free capacity is available, the interference level as well as preferred resources could be conveyed to and utilized by the d-eNB to provide an efficient resource partitioning. In order to achieve this advantage, the OI-r and the HII-r message can be sent from the RN to the d-eNB.

The d-eNB may inform the RN about the sub-frames and PRBs that the RN can use to schedule its UEs. An HII-r message sent from the d-eNB to the RN can be used for this purpose.

Hence, the HII-r message may comprise the information on which resources the d-eNB intends to schedule its users and in particular which resources have been assigned to the other RNs and therefore cannot be used by the target RN. The target RN may derive from such HII-r message which sub-frames and PRBs it can use for its UEs, i.e. which sub-frames and PRBs are neither used by the d-eNB nor by any adjacent RNs.

In an exemplary scenario, the RN upon receiving the resource partitioning from the d-eNB (i.e., the HII-r message as indicated above) executes the suggested allocation. For example, the d-eNB may force the RN to use specific resources as indicated in the resource partitioning conveyed via the HII-r message.

HII-r messages for different RNs can be compressed to reduce the overhead over the wireless backhaul link. In this scenario, the HII-r message may be broadcasted and it may contain the resource partitioning information for n RNs, wherein, based on the broadcast message, the individual RNs may have to be able to distinguish their specific resource partitioning from each other. To differentiate the resource partitioning between these n RNs, a bitmap of $[\log_2{}^n]$ levels (for n>1) can be provided instead of only 1 bit.

Figure 4:
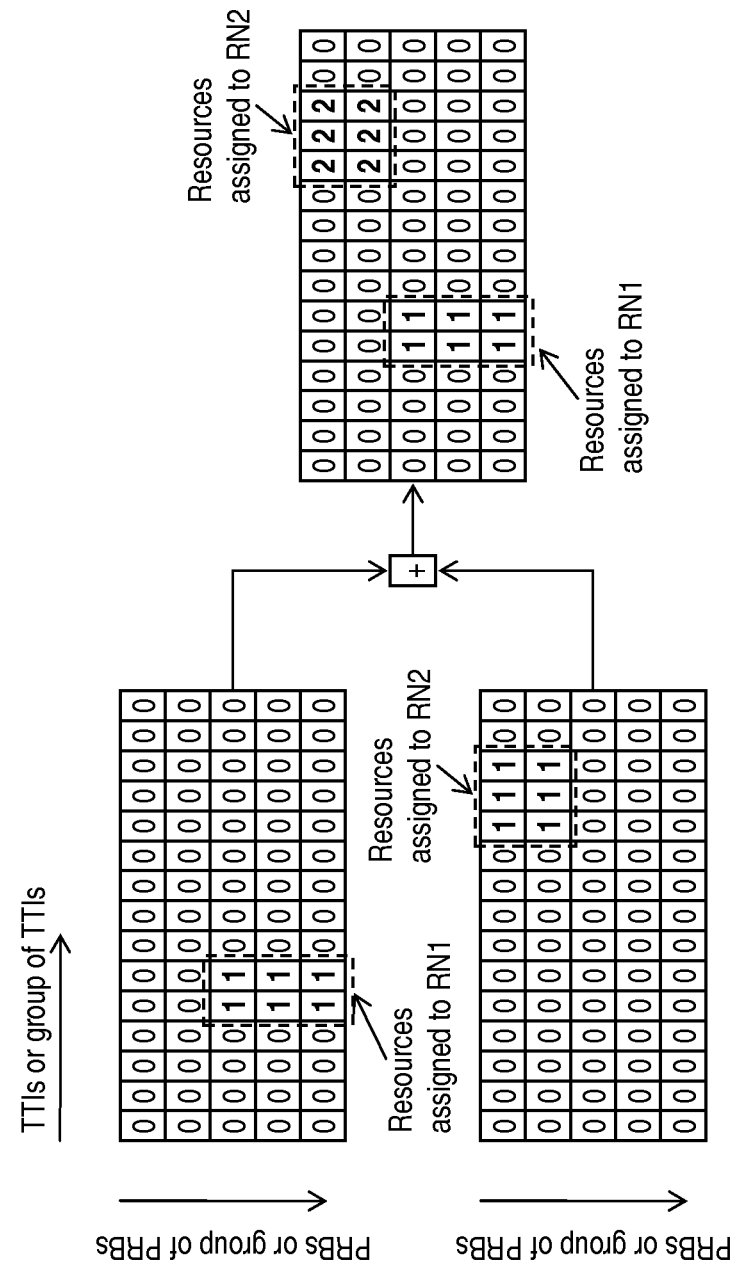
FIG. 4 shows a schematic diagram visualizing a resource partitioning scheme for two relay nodes, wherein the partitioning scheme is condensed in a single HII-r message that could thus be broadcasted towards both relay nodes.

FIG. 4 shows a schematic diagram visualizing a resource partitioning scheme for two relay nodes RN1 and RN2, wherein the partitioning scheme is condensed in a single HII-r message that could thus be broadcasted towards both relay nodes.

The resources assigned to the different RNs do not overlap. In case of overlapping resources, the RNs may be divided into groups (i.e., RNs belong to the same group only if assigned resources do not overlap). An HII-r message can be broadcasted for each RN within a group.

For example, 12 RNs may be deployed. Using 3 groups, only 2 bits are required for indicating the HII-r to the RN within the broadcast, rather than 4 bits.

Alternatively or additionally, two RNs using the same resource partitioning can be assigned the same ID and they may extract the same information from the load message broadcasted. Information about the RNs of the same group can be sent on a broadcast channel (R-PBCH) between the d-eNB and the RN.

A reduction of the overhead data over the backhaul link can be achieved by compressing the information of n TTIs in one TTI and/or the information contained in m PRBs into one PRBs.

Figure 5:
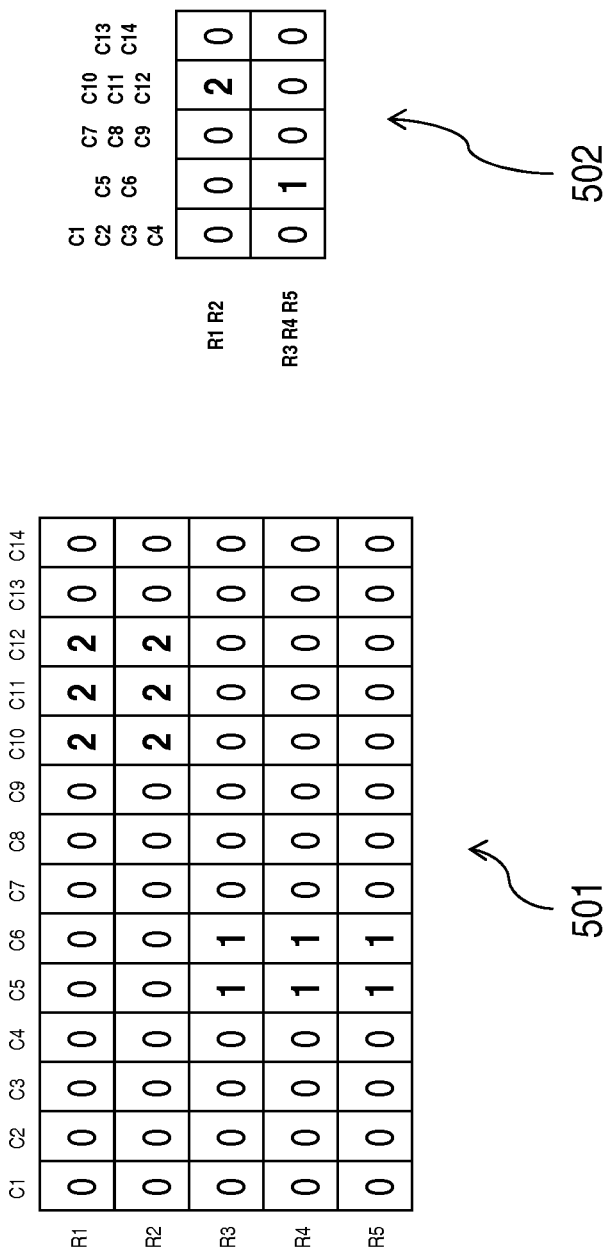
FIG. 5 shows a schematic block structure depicting an example of how to compress resource partitioning information.

FIG. 5 shows a schematic block structure depicting an example of how to compress resource partitioning information. An exemplary resource block 501 (comprising resources in, e.g., frequency and time domain) comprises several columns C1 to C14 and several rows R1 to R5. The values of columns C1, C2, C3 and C4 can be compressed to one column, the values of columns C5 and C6 can be compressed to one column, the values of columns C7 to C9 can be compressed to one column, the values of column C10 to C12 can be compressed to one column and the values of columns C13 and C14 can be compressed to one column. Accordingly, the values of rows R1 and R2 can be compressed to one row and the values of rows R3 to R5 can be compressed to one row. This results in a compressed block 502.

In the example above, only continuous columns and rows are compressed. However it is also a solution that all the columns C1, C2, C3, C4, C7, C8, C9, C13 and C14 can be compressed to one column, even though these columns are non contiguous. Similar schemes can be applied for rows as well. In a further embodiment, different column compression schemes can be applied for different rows and/or different columns. For example, different information can be sent for subframes that are used for backhaul and for subframes that are used for access in the particular relay node. In a further embodiment, only information of one kind of subframes can be conveyed. Such pre-determined compression schemes avoid having to convey information about the column/row aggregation, because the latter may be available already in advance due to previous configurations.

In case the PRBs to be assigned to a particular RN are contiguous, it may suffice transmitting the coordinates of the relevant parts of the bitmap rather than the whole bitmap. With regard to the example shown in FIG. 5, the allocation of the relay node RN1 may be specified by the coordinates (C5, R3) and (C6, R5).

It is noted that different compression schemes can be utilized. Each compression scheme may reduce the overhead on the backhaul link. The compression utilized may depend on an amount of overhead that is deemed acceptable on the backhaul link. For example, for low and medium loads in the network (the backhaul link is not overloaded in such cases), it might be beneficial to exchange more precise information regarding the resource partitioning conducting a reduced or no compression scheme. High compression schemes may even not convey all the available information. However, the high compression schemes allows for a more generic representation, which may be sub-optimal with regard to the amount of data that could be utilized, but may significantly reduce the overhead on the backhaul link.

Figure 6:
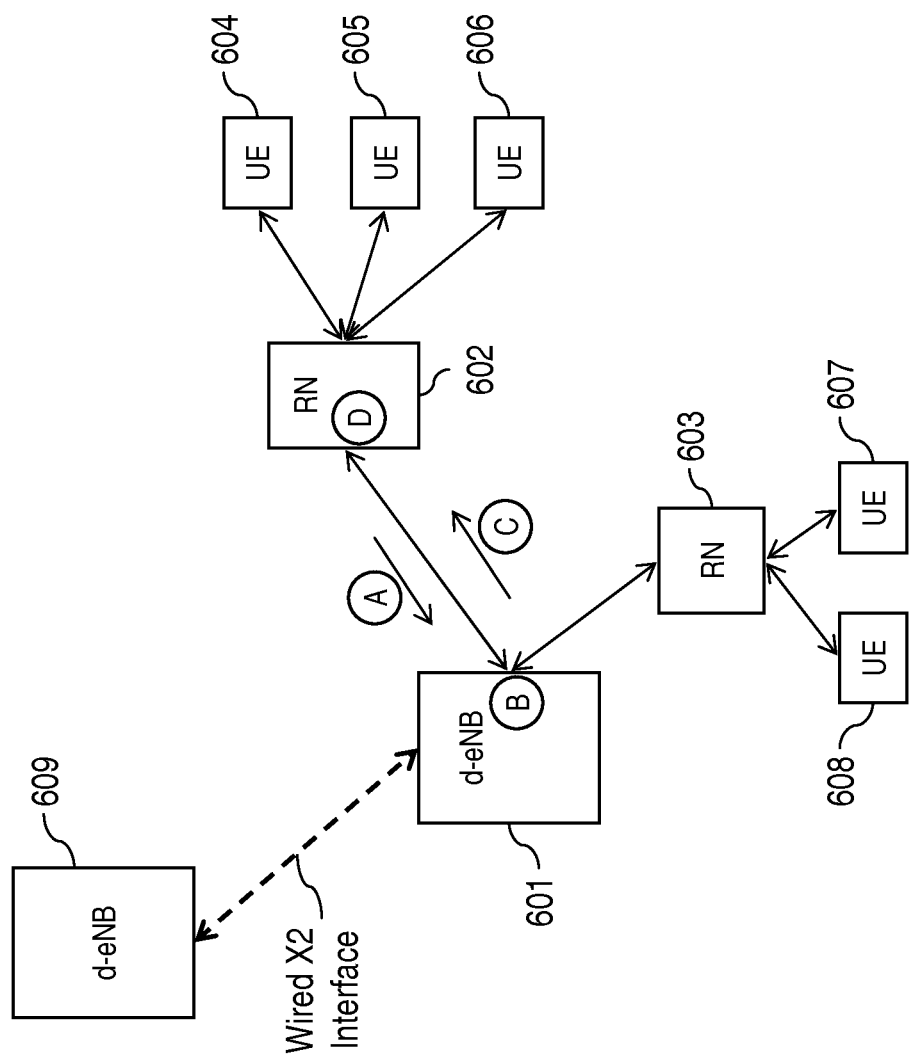
FIG. 6 shows a schematic diagram of a relay network scenario.

FIG. 6 shows a schematic diagram of a relay network scenario. A base station d-eNB 601 serves two relay nodes 602, 603, wherein the UEs 604 to 606 are connected to the relay node 602 and UEs 607, 608 are connected to the relay node 603. The base station d-eNB 601 is connected via a wired X2-interface with another base station d-eNB 609. The latter base station d-eNB 609 may or may not serve additional relay nodes (not shown in FIG. 6).

In a step (A), the relay node 602 sends a load information message to the base station d-eNB 601 comprising a partitioning request information indicating resource blocks and sub-frames that would preferably be used by the relay node 602 to serve its UEs 604 to 606. In a step (B), the base station d-eNB 601 determines which resources to be allocated for this relay node 602. The base station d-eNB 601 may consider the resources allocated to the relay node 603, the interference situation with the adjacent base station 609 and the resources allocated UEs directly connected to the base station d-eNB 601 (not shown). Based on the information available at the base station d-eNB 601, the base station d-eNB 601 decides which resources to be allocated by the relay node 602 and conveys a load information message comprising resource blocks and sub-frames towards the relay node 602. The relay node 602 in a step (D) allocates these resources, i.e. resource blocks and sub-frames for its UEs 604 to 606.

The messages conveyed in steps (A) and (C) may be messages based on HII-messages and/or OI-messages of LTE Release 8. The messages may in particular comprise (compressed) bitmap information to be used identifying resources that are or may be subject to an allocation.

It is noted that the message of step (A) may comprise a resource partitioning request sent via an HII-r message and the message of step (C) may comprise a resource partitioning command sent via an HII-r message.

Figure 7:
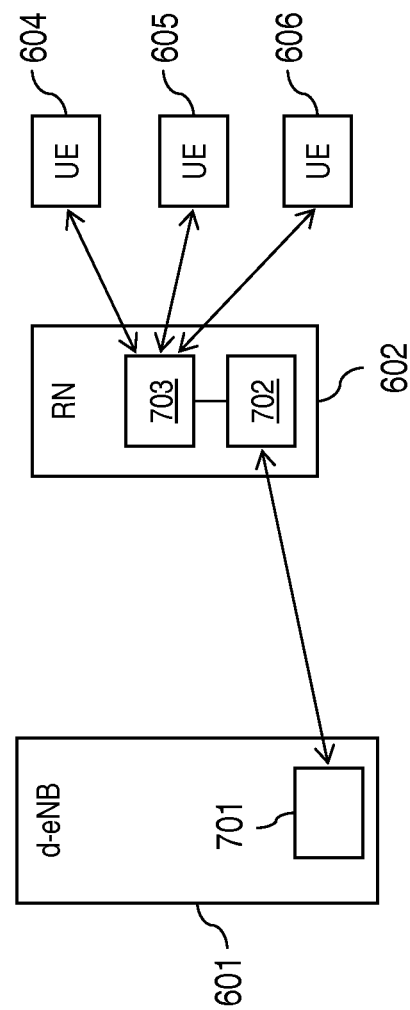
FIG. 7 shows an extract of FIG. 6 comprising the base station d-eNB and the relay node in more detail.

FIG. 7 shows an extract of FIG. 6 comprising the base station d-eNB 601 and the relay node 602 in more detail. The relay node 602 comprises a processing unit 702 and a radio unit 703 for conveying traffic to/from the UEs 604 to 606. It is noted that the processing unit 702 and the radio unit 703 could be deployed separately or may be combined as a single processing unit.

The base station d-eNB 601 comprises a processing unit 701 that is connected to the processing unit 702 of the relay node 602 via a backhaul link, in particular a wireless (radio) interface.

It is noted that the block structure shown in any of the figures, in particular FIG. 7, could be implemented by a person skilled in the art in various ways, e.g., by providing various physical units. The base station d-eNB 601 or the relay node 602, in particular the processing units 701, 702 could be realized each as at least one logical entity that may be deployed as hardware, program code, e.g., software and/or firmware, running on a processor, e.g., a computer, microcontroller, ASIC, FPGA and/or any other logic device.

The functionality described herein may be based on an existing component of a (wireless) network, which is extended by means of software and/or hardware. The eNB mentioned herein could also be referred to as any base station pursuant to any communication standard.

The base station 601 or the relay node 602 may each comprise at least one physical or logical processing unit 701, 702 that is arranged for conducting load partitioning for the at least one relay node based on at least one load information message, wherein the at least one load information message comprises information regarding resource blocks and sub-frames.

Further Advantages:

The load information exchange between neighboring eNBs does not have to be modified by this approach and may be processed as specified for Release 8. However, the solution provided herein may also be applied for exchanging load information between two neighboring eNBs via an X2 interface (describing several TTIs). This may improve interference coordination between neighboring cells.

It is noted that the load information may be exchanged between eNBs via an X2 interface even in case no relay node is available or served by either eNB. The compression scheme described herein for resource partitioning information (see, e.g., FIG. 5 above) may apply accordingly between base stations, e.g., (peer) eNBs using said X2 interface.

In LTE Release 8, the HII and OI bitmaps are specified for each cell of the sending eNB, and as much as 256 cells can be supported by the eNB (3GPP TS 36.423). In case a RN only has a single cell, the possibilities of HII and OI bitmaps can be used to contain multiple cell information to support the multiple TTI bitmap extensions without changing the message format of Release 8. For example, to provide a bitmap containing information of 40 TTIs of resource partitioning, the "cells" of the RN can be set to 40. Due to this flexibility, the resource partitioning as described herein can be realized by using the message format of LTE Release 8. This has the advantage that now new message encoding schemes and algorithms have to be implemented.

It is suggested re-using the load information HII messages to also transport resource partitioning information. Specific messages could be defined for the resource partitioning purposes. However, instead of such separate messages to be provided, including the resource partitioning information in existing messages may reduce the overhead on the backhaul link. However, this approach does of course not require utilizing existing message formats. Instead, new messages may be employed for communicating resource partitioning, in particular allowing for compression by parallel delivery.

The messages allow performing resource partitioning in uplink direction. In downlink direction, the same messages can be applied by using the same formats/principles of the HII-r messages also for the downlink messages (RNTP messages) that can be used for exchanging the downlink resource partitioning information. Since the RNTP messages contain extra information on top of the bitmap, the overhead on the backhaul link can be reduced by including the downlink resource partitioning information directly in the HII-r messages. This can be done using a similar bitmap as for the uplink resource partitioning information. For example, if 40 TTIs shall be supported in one bitmap, an HII-r message with 80 columns can be created, wherein the first 40 columns represent the UL information and the remaining columns represent the DL information. As indicated above with regard to the "cells", this can be achieved by setting the number of "cells" to 80.

List of Abbreviations:
3GPP 3rd Generation Partnership Project
d-eNB donor eNB
DL Downlink
DVB Digital Video Broadcasting
DVB-H DVB—Handheld
eNB Enhanced NodeB
HII High Interference Indication
ICIC Inter-Cell Interference Coordination
ID Identity
LTE Long Term Evolution
LTE-A LTE Advanced
MAC Media Access Control
MBSFN Multicast Broadcast Single Frequency Network
OI Overload Indication
PBCH Physical Broadcasting Channel
PHY Physical Layer
PRB Physical Resource Block
RAN Radio Access Network
RLC Radio Link Control
RN Relay Node
RNTP Relative Narrowband TX Power
R-PBCH Physical Broadcasting Channel (PBCH) between e-NB and Relay
RRM Radio Resource Management
RS Relay Station (also referred to as Relay Node)
TTI Transmission Time Interval
TX Transmission
UE User Equipment (mobile terminal)
UL Uplink

The invention claimed is:

1. A method comprising:
data processing in a wireless network, comprising:
serving at least one relay node by a base station;
conducting load partitioning for the at least one relay node based on at least one load information message that comprises information regarding resource blocks and sub-frames and bitmap information indicating the resource blocks and sub-frames; and
compressing the bitmap information depending on a traffic situation on a backhaul link and/or an overhead traffic threshold on the backhaul link, wherein the compressing the bitmap information is done by combining at least one of columns and rows of a resource block such that the at least one of columns and rows having identical values are combined to a single at least one of a column and a row.

2. The method according to claim 1, wherein the at least one load information message is based on a high interference indication message and/or on an overload indication message.

3. The method according to claim 1, wherein the resource blocks comprise at least one group of resource blocks and/or wherein the sub-frames comprise at least one group of sub-frames.

4. The method according to claim 1, wherein the at least one load information message is sent from the at least one relay node to the base station comprising a partitioning request information.

5. The method according to claim 4, wherein the partitioning request information comprises resource blocks and sub-frames that are preferred by the at least one relay node.

6. The method according to claim 4, wherein the partitioning request information comprises additional resource blocks and sub-frames that are preferred by the at least one relay node, wherein the resource blocks and sub-frames requested extend beyond what is currently required by the at least one relay node for conveying data.

7. The method according to claim 1, wherein the at least one load information message is sent from the at least one relay node to the base station comprising information about interference levels.

8. The method according to claim 1, wherein the at least one load information message is sent from the base station to the at least one relay node comprising load partitioning information, wherein the at least one relay node utilizes said load partitioning information.

9. The method according to claim 8, wherein the at least one load information message is sent from the base station to the at least one relay node comprising information on resources the base station assigned to other relay nodes and/or resources used by the base station itself.

10. The method according to claim 1, wherein the wireless network is a 3GPP wireless network, in particular an LTE-A network.

11. The method according to claim 1, wherein the at least one load information message is sent from the base station to the at least one relay node comprising load partitioning information, wherein the at least one relay node utilizes said load partitioning information.

12. A device comprising:
   at least one processor; and
   at least one memory including computer program code, where the at least one memory and the computer program code are configured, with the at least one processor, to cause the device to at least:
perform data processing in a wireless network comprising
   conducting load partitioning for at least one relay node based on at least one load information message that includes information regarding resource blocks and sub-frames and bitmap information indicating the resource blocks and sub-frames,
   wherein the at least one relay node is served by a base station,
   wherein the bitmap information is compressed depending on a traffic situation on a backhaul link and/or an overhead traffic threshold on the backhaul link, and
   wherein the compressing the bitmap information is done by combining at least one of columns and rows of a resource block such that the at least one of columns and rows having identical values are combined to a single at least one of a column and a row.

13. A communication system comprising at least one device according to claim 12.

14. The device of claim 12, wherein the at least one load information message is based on a high interference indication message and/or on an overload indication message.

15. The device of claim 12, wherein the resource blocks comprise at least one group of resource blocks and/or wherein the sub-frames comprise at least one group of sub-frames.

16. The method according to claim 12, wherein the at least one load information message is sent from the at least one relay node to the base station comprising information about interference levels.

17. A non-transitory computer-readable medium having computer-executable instructions adapted to cause a computer system including a processor to:
   serve at least one relay node by a base station;
   conduct load partitioning for the at least one relay node based on a load information message that includes information regarding resource blocks and sub-frames and bitmap information indicating the resource blocks and sub-frames; and
   compress the bitmap information depending on a traffic situation on a backhaul link and/or an overhead traffic threshold on the backhaul link, wherein the compressing the bitmap information is done by combining at least one of columns and rows of a resource block such that the at least one of columns and rows having identical values are combined to a single at least one of a column and a row.

18. The non-transitory computer-readable medium of claim 17, wherein the computer-executable instructions are adapted to cause the computer system to send the load information message from the at least one relay node to the base station comprising partitioning request information.

19. The non-transitory computer-readable medium of claim 18, wherein the partitioning request information comprises resource blocks and sub-frames that are preferred by the at least one relay node.

20. The non-transitory computer-readable medium of claim 18, wherein:
   the partitioning request information comprises additional resource blocks and sub-frames that are preferred by the at least one relay node; and
   the resource blocks and sub-frames requested extend beyond what is currently required by the at least one relay node for conveying data.

* * * * *